United States Patent [19]

Bravata, Jr.

[11] Patent Number: 5,325,843
[45] Date of Patent: Jul. 5, 1994

[54] REMOVABLE CATCH PAN FOR A BROILER

[76] Inventor: Sam Bravata, Jr., 4124 Jefferson, SE., Wyoming, Mich. 49508

[21] Appl. No.: 145,393

[22] Filed: Oct. 29, 1993

Related U.S. Application Data

[63] Continuation of Ser. No. 699,914, May 14, 1991, abandoned.

[51] Int. Cl.⁵ .............................................. F24C 15/20
[52] U.S. Cl. .............................. 126/299 C; 126/41 R; 126/51; 126/25 R; 99/444
[58] Field of Search ............... 126/299 C, 25 R, 25 C, 126/37 A, 37 B, 41 R, 41 D, 51, 299 R; 99/444–446

[56] References Cited

U.S. PATENT DOCUMENTS

| D. 85,696 | 12/1931 | Hoffstetter et al. |
| D. 296,648 | 4/1988 | Faaborg. |
| D. 305,291 | 1/1990 | Klev. |
| 1,001,383 | 8/1911 | Coty. |
| 1,536,016 | 4/1925 | Kavanagh. |
| 1,722,513 | 7/1929 | Witter. |
| 1,725,376 | 8/1929 | Shenton. |
| 1,974,643 | 9/1934 | Collins. |
| 2,110,708 | 3/1938 | Klemme. |
| 3,244,163 | 4/1966 | McGlaughlin ................... 126/25 R |
| 3,325,038 | 6/1967 | Ferney. |
| 4,686,958 | 8/1987 | Skelton et al. ............... 126/25 R X |
| 4,773,319 | 9/1988 | Holland. |

FOREIGN PATENT DOCUMENTS 39194 11/1981 European Pat. Off. .......... 126/25 R Primary Examiner—Larry Jones
Attorney, Agent, or Firm—Waters & Morse

[57] ABSTRACT

A catch pan for a standard broiler includes a trough extending behind the grille below the level of the grille surface. One side of the trough hooks over the ridge present in the standard broiler, and the other side of the trough extends upward to form a stop plate for debris scraped from the grille. Handles permit the catch pan to be lifted off the ridge for cleaning.

7 Claims, 1 Drawing Sheet

REMOVABLE CATCH PAN FOR A BROILER

CROSS REFERENCE TO RELATED APPLICATION

This is a continuation of application Ser. No. 07/699,914, filed May 14, 1991, now abandoned.

BACKGROUND OF THE INVENTION

Continuing use of a standard broiler, particularly in commercial food-service establishments, generates a lot of debris composed mainly of charred fat and meat particles. This material must be periodically scraped off the grille to maintain proper conditions for cooking. It is common practice to just scrape the accumulations to the rear, and permit them to fall off the back of the grille onto the floor. The standard broiler is mounted on rollers or casters, and is occasionally pulled far enough away from an adjacent wall to permit cleaning the floor area. This practice tends to keep the floor saturated with grease, and produces undesirable odors that are not associated with the efficient and sanitary preparation of tasty food. The additional effort in time required to move the broiler and clean the floor area is obvious.

SUMMARY OF THE INVENTION

The present invention provides a catch pan preferably at the rear of the broiler at a level close to coplanar with the grille. The catch pan includes a trough extending along the back of the broiler, and a hooked edge of the trough engages a ridge that is present on the standard broiler structure at about the level of the grille. The opposite side of the trough extends upward at a rearward inclination to form a stop plate for debris thrown to the rear in the scraping operations. Handles on the device make it easy to lift it off the ridge, dump it out, and clean it.

DESCRIPTION OF THE PREFERRED EMBODIMENT

Figure 1:
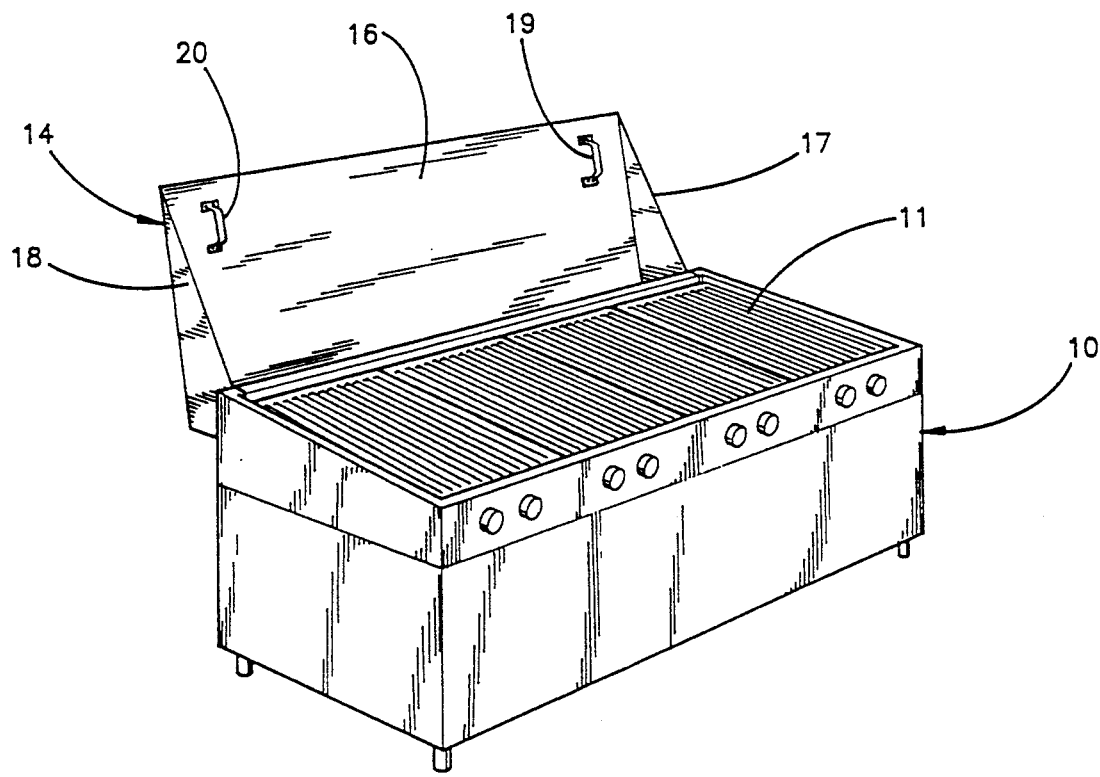
FIG. 1 is a perspective view of a standard broiler equipped with a catch pan provided by the present invention.

Referring to the drawings, the standard broiler generally indicated at 10 has a grille, or grate, 11 on which meat is normally placed to be broiled by the flame from burners positioned under the grate as indicated at 12. The top rear of the broiler 10 is defined by the ridge 13. This is standard construction.

The catch pan structure generally indicated at 14 is essentially a trough, in which the front wall terminates at its upper extremity in the hook portion 15 embracing the ridge 13 for the support of the device. The rear wall 16 extends upwardly well beyond the level of the grille surface and the ridge 13 to form a stop plate that intercepts any debris scraped off from the grille surface so that it drops down into the trough, and collects there. The rearward inclination of the plate 16 permits it to contact an adjacent wall, where there may be obstructions at the lower extremity of the broiler that prevent the broiler from being shoved close enough to the wall to prevent gaps where the debris could fall behind the catch pan. End plates as shown at 17 and 18 in FIG. 1 complete the confinement area to prevent endwise loss of the debris that may have been accumulated. Handles as shown at 19 and 20 facilitate the vertical disengagement of the device from the ridge 13, so that it can be dumped, cleaned, and returned to its illustrated position.

Figure 2:
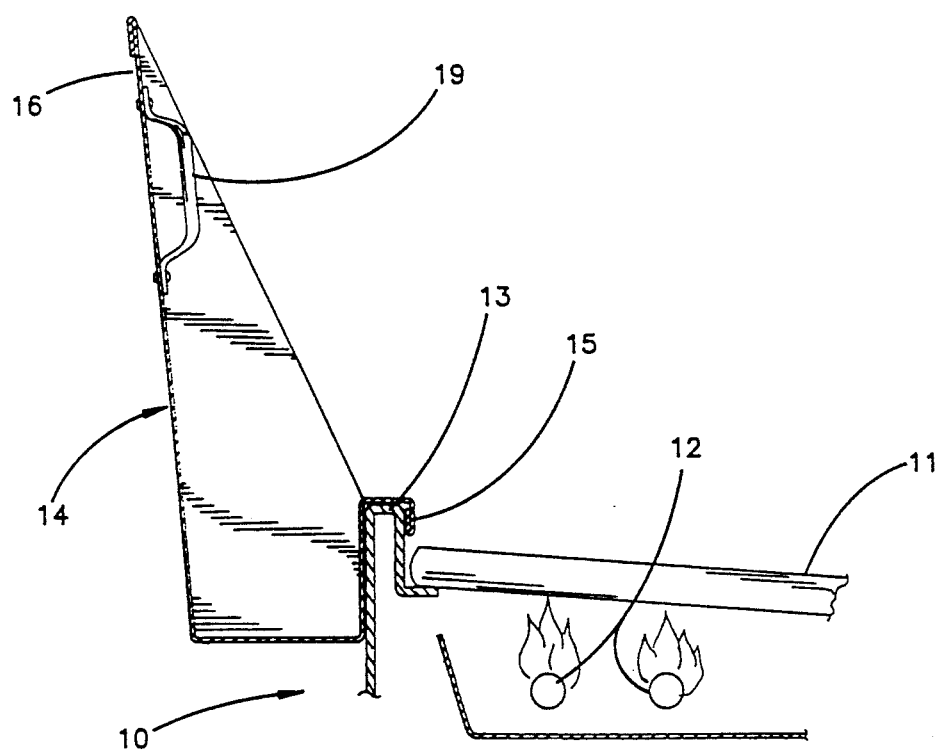
FIG. 2 is a sectional elevation from the side through the central portion of the catch pan and the rear portion of the broiler.

To accommodate the device to the configuration of the usual standard broiler, it is preferable that the gap of the hooked portion 15 should be approximately 1⅜", with the down-turned flange approximately 1". The bottom of the trough 14 should be about 3" below the top of the hooked portion 13 to provide for the accumulation of the usual amount of debris that can be expected between cleaning operations. The depth of the bottom of the trough (in a front-rear direction), as viewed in FIG. 2, can be approximately 4", and the height of the back panel 16 from the bottom of the trough should be approximately 18", to provide an adequate backstop for debris that may be thrown to the rear during aggressive scraping operations. The top of the plate 16 should be approximately 1" further to the rear than the lower inner edge of the trough, to provide the desirable degree of upward-rearward inclination assuring close contact between the top of the plate 16 and an adjacent wall. The entire device is preferably of sheet metal construction, which can be either aluminum, or stainless steel.

I claim:

1. A removable catch pan for receiving and holding debris scraped from a grille of a standard broiler over a rear edge thereof, wherein the rear edge of the broiler is about at the level of the grille, the catch pan comprising a trough in the form of a relatively narrow, elongated container having an open top and closed bottom, the container having a relatively low front wall on an elongated side of the container and a relatively high back wall on an opposite elongated side of the container, the catch pan further including mounting means for removably mounting the catch pan at the rear edge of the broiler in a position such that debris scraped over the rear edge of the broiler passes over the top edge of the front wall and falls into the container for collection, the back wall of the container extending above the top edge of the front wall a sufficient distance that debris scraped forcefully from the rear edge of the broiler strides the back wall and is deflected into the container, the catch pan being manually removable to remove debris from the container.

2. A catch pan according to claim 1 wherein the mounting means comprises hook means at the top edge of the front wall that fits over an upwardly facing ridge at the rear edge of the broiler and supports the catch pan from said ridge.

3. A catch pan according to claim 2 wherein the hook means comprises a flange that extends forwardly and then downwardly from the top edge of the front wall and extends at least a substantial distance along the front wall, such that the flange substantially prevents debris scraped rearwardly from the grille from dropping downwardly between the front wall of the catch pan and the rear edge of the broiler.

4. A catch pan according to claim 1 wherein the catch pan is sized such that it can fit on the rear edge of a broiler that is positioned adjacent a wall, with the catch pan fitting between the wall and the rear edge of the broiler, the back wall of the catch pan being inclined upwardly and rearwardly with respect to a vertical plane, such that an upper edge of the back wall of the catch pan can be positioned flush against a wall to prevent discharged debris from passing behind the catch pan over the upper edge of the back wall, while the bottom of the catch pan remains separated from the wall so as to provide clearance for obstructions.

5. A catch pan according to claim 1 wherein the catch pan has a rectangular horizontal cross section, with the front and back walls being enclosed by end walls at opposite side edges thereof and a bottom enclosing bottom edges of the walls.

6. The catch pan according to claim 5 wherein the front wall is at least about three (3) inches high and the back wall is at least about eighteen (18) inches high, with the front to back width of the bottom of the trough being about four (4) inches and the top edge of the back wall extending rearwardly at least about one (1) inch more than the bottom of the back wall.

7. A catch pan according to claim 1 further comprising a pair of laterally spaced handles on a portion of the catch pan that is above the level of the grille for lifting the catch pan off the broiler for cleaning.

* * * * *